Jan. 21, 1930.    R. REID ET AL    1,744,677
SEPARATING MACHINE
Filed April 30, 1927    2 Sheets-Sheet 1
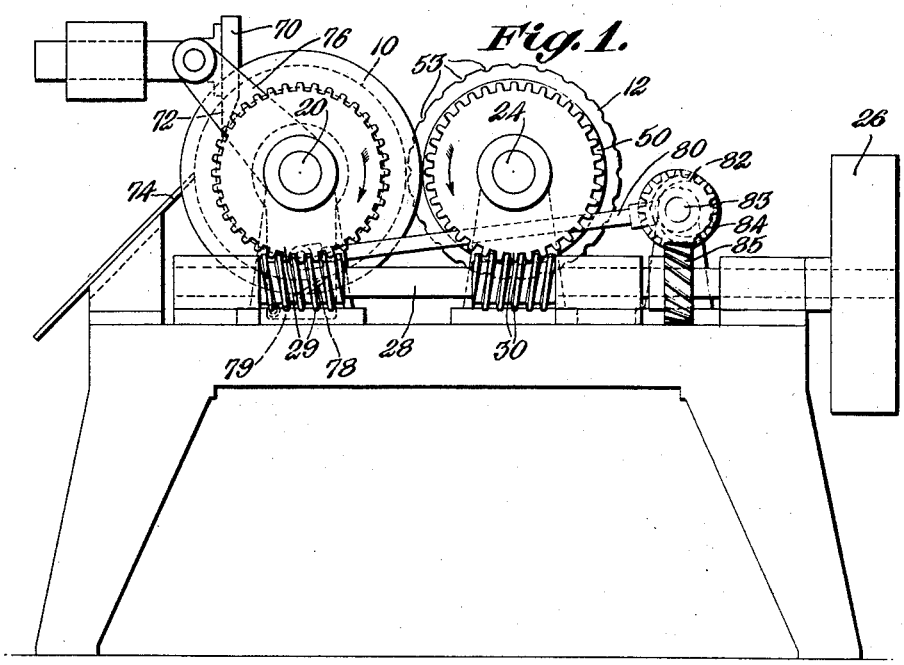
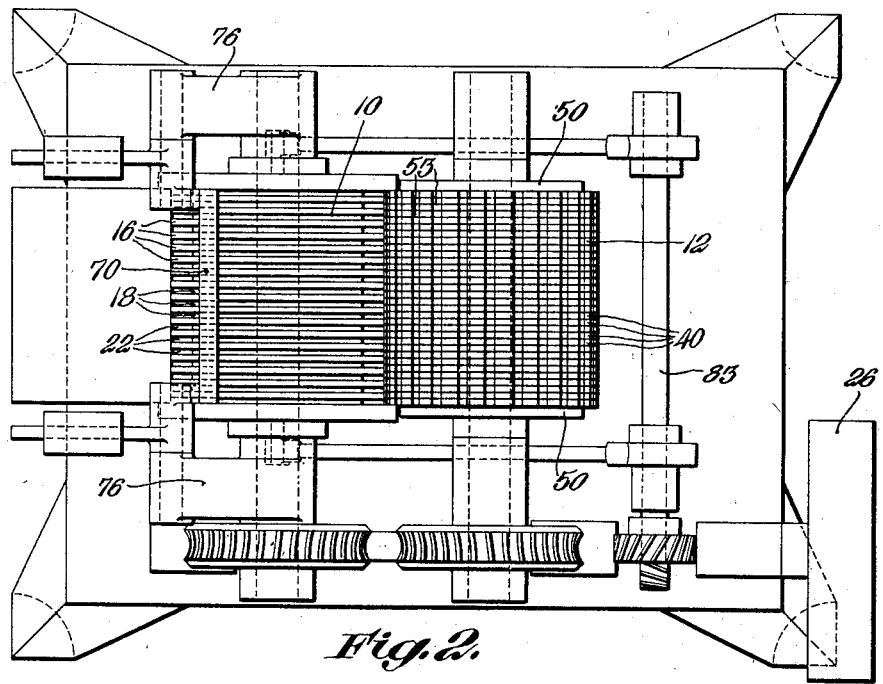

Jan. 21, 1930.  R. REID ET AL  1,744,677
SEPARATING MACHINE
Filed April 30, 1927   2 Sheets-Sheet 2
Fig. 3.
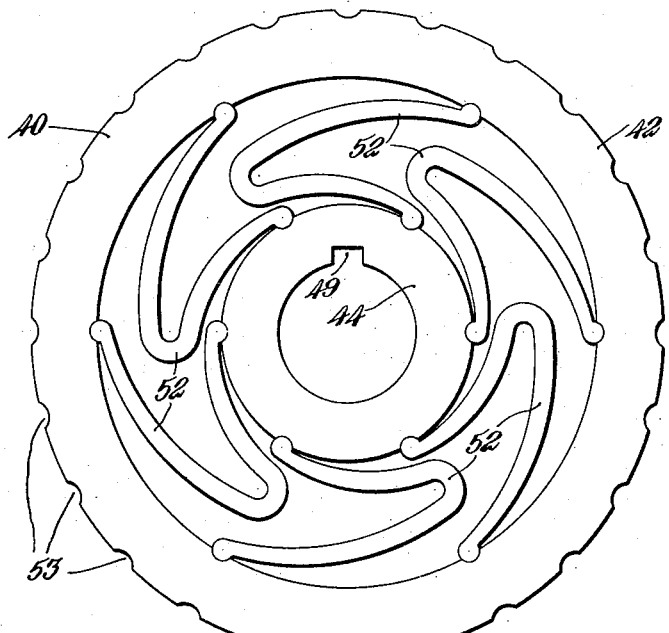
Fig. 4.
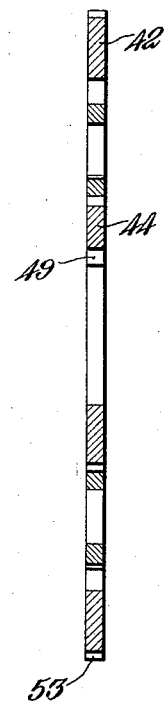
Fig. 5
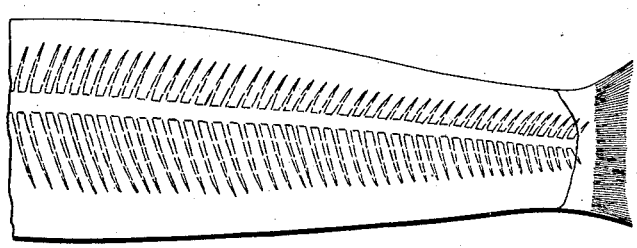
Fig. 6.
Inventors:
Robert Reid
Andrew S. Reid
by J. Stanley Churchill
atty.

Patented Jan. 21, 1930

1,744,677

UNITED STATES PATENT OFFICE

ROBERT REID AND ANDREW S. REID, OF BEVERLY, MASSACHUSETTS

SEPARATING MACHINE

Application filed April 30, 1927. Serial No. 187,809.

This invention relates to a machine for separating fish meat from bones, which is particularly designed for use in separating the meat from the bones of that portion of a fish remaining after the filets have been cut off.

One object of the invention is to provide a novel and improved machine of the character specified which is adapted to perform its separating operation in a rapid, economical and practical manner.

A further object of the invention is to provide an improved presser member for use in a separating machine of the character specified.

With these objects in view and such others as may hereinafter appear, the invention consists in the machine and in the presser roll hereinafter described and particularly pointed out in the claims at the end of this specification.

In the drawings which illustrate the preferred embodiment of the invention, Figs. 1 and 2 are views in side elevation and plan, respectively, of the improved separating machine; Fig. 3 is a side elevation of one of the improved presser rolls; Fig. 4 is a vertical section of one of the disks of which the improved presser roll is formed; and Figs. 5 and 6 are views in side elevation and plan, respectively, of that portion of a fish remaining after the filets have been cut off and upon which the present machine is adapted to operate to efficiently separate the fish meat from the bones.

In general the present invention contemplates an improvement upon the separating machine forming the subject matter of a copending application filed by Robert Reid, one of the joint inventors hereof, and to which reference may be made by permission. The present invention has to do with improving the construction of the presser member in such separating machine, to increase its durability, and render the machine more efficient in operation and to facilitate the cleaning of the presser member.

The invention is preferably embodied in a machine which as stated above is designed for operating upon the portion of a fish remaining after the filets have been cut off in order to salvage the fish meat from the bones, and as illustrated in the drawings is provided with a separating member 10 and a presser member 12. Both the separating member 10 and presser member 12 preferably comprise rolls or drums mounted upon shafts 20, 24 journalled in suitable bearings in the machine frame and arranged to be driven from a source of power (not shown) through a driven pulley 26 on the end of a main driving shaft 28 and through cooperating right and left-hand worm wheels 29, 30 by which the separating and presser rolls 10 and 12 are rotated in the opposite directions, illustrated by the arrows in Fig. 1.

The separating member 10 is provided with a plurality of openings or spaces into which the fish meat is forced by the cooperate action of the presser member 12 with the separating member 10, during the operation of the machine, and as herein shown the separating member 12 is formed of a plurality of disks 16 maintained in spaced relation by spacing members 18 to provide grooves 22 between adjacent disks. The disks and spacing members 16, 18 are mounted upon the shaft 20 and are secured in fixed relation thereto by end flanges as shown.

As herein shown, the presser member 12 is made up of a plurality of sections or individual members 40 comprising the disks illustrated in detail in Figs. 3 and 4. Each disk 40 preferably comprises two ring sections, an outer ring section 42 and an inner ring section 44. Provision is made for yieldingly connecting together the ring sections 42, 44 in order to permit relative movement of the outer ring with relation to the inner ring under certain conditions in the operation of the machine, as will be described. The inner ring section of each of the individual members 40 is of a size adapted to fit upon the supporting shaft 24, being provided with a keyway 49 by which it may be keyed to the shaft to rotate therewith. The complete presser member 12 is made up of a sufficient number of the individual sections 40 assembled side by side upon the shaft 24, so that the length of the presser member is substantially equal to the length of the separating member 10, and so that the presser member may fit between the end flanges of the separating member 10 in the manner illustrated in Fig. 2. The shafts 20, 24 are spaced a distance apart so that the presser roll engages and bears upon the periphery of the disks 16 of the separating member 10. The individual members 40 of the presser roll are retained in operative position by end flanges 50.

As herein shown, the outer and inner ring sections 42, 44 of each of the individual members 40 making up the presser roll, are connected together by a plurality of V-shaped pieces of spring steel 52, the ends of which are provided with knobs which fit into recesses in the adjacent surfaces of the outer and inner ring sections 42, 44, thus retaining the spring members in operative position. In the operation of the machine, the portion of the fish remaining after the filets have been removed is fed tail first downwardly between the separating member 10 and presser member 12. In this position the bones of the fish extending outwardly from the longitudinal column are caused to extend transversely of the disks 16 of the separating member and across the grooves 22. The portions of the fish coming between the ends of the disks 16 of the separating member and the particular ring section 40 immediately opposite the disk, causes the relative movement of the outer ring section 42 of that particular section 40 of the presser member with relation to the inner ring section and the supporting shaft 24, the springs yielding under the spreading action of the portion of the fish between the disks 16 and the surface of the outer ring section 42. The portions of the fish immediately opposite any of the grooves 22 of the separating member tend to cause similar movement of the outer ring section of the particular individual member 40 of the presser member, but the tension set up in the springs serves to dislodge the fish meat from the bones and to force it into the grooves 22, thus separating the fish meat from the bones.

The outer surface of the outer ring section 42 of each of the individual members 40 making up the presser member 12 is preferably provided with grooves 53 which assist in feeding the fish material between the separating roll 10 and presser roll 12 and as a result the fish material is fed downwardly through the rolls and the bone structure falls through an opening in the bottom of the machine frame where it may be caught in a suitable receptacle (not shown).

The fish meat accumulates in the grooves 22 of the separating member and provision is made for removing it from the grooves, and as herein shown this result is accomplished by a scraper member 70 provided with a plurality of teeth 72 which fit into the grooves and serve to scrape the fish meat from the grooves and to deposit it upon a slide 74 from which it falls into a receptacle (not shown). The scraper member 70 is pivoted upon arms 76 upstanding from the bearings at the opposite sides of the machine and is provided with a counter-weighted portion as shown in Fig. 1. Provision is also made for scraping the surfaces of the disks 16 in order to detach any skin or small bones which may adhere thereto, and for this purpose a reciprocatory scraper member 78 is provided, being pivoted on suitable arms 79 and actuated through links 80 from eccentrics 82 on a counter shaft 83 driven by cooperating spiral gears 84, 85 from the main driving shaft 28. The construction and operation of these scraper members is preferably that illustrated and described in the copending application of Robert Reid above referred to.

From the description thus far it will be observed that the present improved presser member contributes to the successful operation of the machine, that it is durable, may be easily cleaned, and lends itself to economical manufacture.

While the preferred embodiment of the invention has been illustrated and described, it will be understood that the invention may be embodied in other forms within the scope of the following claims.

Having thus described the invention what is claimed is:—

1. In a separating machine, in combination, a separating member provided with a plurality of spaced apart openings for the reception of the material being separated, a presser member cooperating therewith for forcing such material into said openings and comprising a plurality of individual sections each composed of two rigid members, and a yielding connection between said members, and means for moving the presser member to effect a feeding of the material between it and the separating member.

2. In a separating machine, in combination, a separating member provided with a plurality of spaced apart openings for the reception of the material being separated, and a presser member cooperating therewith comprising a roll made up of a plurality of individual ring sections each being mounted to be capable of yielding movement away from the separating member.

3. In a separating machine, in combination, a separating member comprising a roll made up of a plurality of disks spaced apart to provide grooves between adjacent disks, and a presser member made up of a plurality of sections mounted to be capable of independent yielding motion.

4. In a separating machine, in combination, a separating member comprising a roll made up of a plurality of disks spaced apart to provide grooves between adjacent disks, and a presser member comprising a plurality of individual ring sections yieldingly mounted to be capable of relative movement.

5. In a separating machine, in combination, a separating member provided with a plurality of spaced apart openings in the surface thereof for receiving the material to be separted, and a presser member cooperating therewith comprising a rotatable shaft, a plurality of independent sections mounted upon said shaft to rotate therewith and each consisting of an outer ring member and an inner member, and a plurality of springs yieldingly connecting the outer and inner members.

6. A presser member for use in a separating machine of the character described, comprising a roll made up of a plurality of individual sections each composed of an inner member adapted to be mounted upon a shaft, an outer ring member, and a yielding connection between the outer ring member and inner member.

ROBERT REID.
ANDREW S. REID.